United States Patent
Kyllonen

(10) Patent No.: US 10,169,697 B1
(45) Date of Patent: Jan. 1, 2019

(54) RADIO FREQUENCY TAG HAVING INTEGRATED AND SUPPLEMENTAL ANTENNA ELEMENTS

(71) Applicant: AUTOMATED ASSEMBLY CORPORATION, Lakeville, MN (US)

(72) Inventor: Kimmo Kyllonen, Shakopee, MN (US)

(73) Assignee: Automated Assembly Corporation, Lakeville, MN (US)

( * ) Notice: Subject to any disclaimer, the term of this patent is extended or adjusted under 35 U.S.C. 154(b) by 0 days.

(21) Appl. No.: 15/690,453

(22) Filed: Aug. 30, 2017

(51) Int. Cl.
  *G06K 19/00* (2006.01)
  *G06K 19/077* (2006.01)
  *H01Q 1/22* (2006.01)
  *H01Q 7/00* (2006.01)

(52) U.S. Cl.
  CPC . *G06K 19/07749* (2013.01); *G06K 19/07773* (2013.01); *H01Q 1/2225* (2013.01); *H01Q 7/00* (2013.01)

(58) Field of Classification Search
  CPC ....... G06K 19/07749; G06K 19/07773; H01Q 1/2225; H01Q 7/00
  USPC ................ 235/492, 487, 488, 493, 380, 375
  See application file for complete search history.

(56) References Cited

U.S. PATENT DOCUMENTS

| | | |
|---|---|---|
| 7,119,693 B1 | 10/2006 | Devilbiss |
| 8,248,314 B2 | 8/2012 | Ash, Jr. et al. |
| 2013/0062419 A1* | 3/2013 | Finn .................. G06K 19/07718 235/492 |

OTHER PUBLICATIONS

Tran et al., "Compact Crossed Dipole Antenna for a Broadband UHF-RFID Tag," The 2015 Int'l Workshop on Antenna Technology (iWAT), 2015 Proceedings IEEE, pp. 379-380, IEEE (Mar. 4, 2015).
Zeng et al., "A Broadband Antenna for Multi-Standard UHF RFID Tag Applications," 2010 Int'l Conf on Microwave and Millimeter Wave Tech (ICMMT), 2010 Proceedings, IEEE, pp. 1898-1900 (Jul. 26, 2010).

* cited by examiner

*Primary Examiner* — Karl D Frech
(74) *Attorney, Agent, or Firm* — Crawford Maunu PLLC

(57) ABSTRACT

A disclosed RF tag includes a substrate and an integrated circuit (IC) package disposed on the substrate. The IC package has an integrated antenna element coupled to circuitry of the IC package. The RF tag also includes an external antenna element of round wire having at least one half turn disposed against two or more surfaces of the IC package. The external antenna element is inductively coupled to the integrated antenna element, and the IC package laterally supports the at least one half turn of the external antenna element.

10 Claims, 4 Drawing Sheets

RADIO FREQUENCY TAG HAVING INTEGRATED AND SUPPLEMENTAL ANTENNA ELEMENTS

FIELD OF THE INVENTION

The disclosure describes radio frequency (RF) tags having an integrated antenna element in an integrated circuit (IC) die, and wire of a supplemental antenna element wrapped at least partially around the IC die.

BACKGROUND

RF transponders are used in a variety of applications including identification, mobile payment, and environmental sensing and reporting. Makers of RF transponders face the ongoing challenge of making structures that are both functional and economically competitive. For many applications, RF transponders and associated wiring are attached to a flexible substrate. Prior to mounting the electronic device, wiring patterns may be formed on the substrate using a print-and-etch process to construct the antenna. Making RF transponder arrangements on a flexible substrate may be prohibitively expensive for some applications. The expense is attributable in part to the print-and-etch processes used in creating the wiring pattern. Expensive chemicals are required for print-and-etch processes, and hazardous waste is a byproduct.

SUMMARY

A disclosed radio frequency (RF) tag includes a substrate and an integrated circuit (IC) package disposed on the substrate. The IC package has an integrated antenna element coupled to circuitry of the IC package. The RF tag also includes an external antenna element of round wire having at least one half turn disposed against two or more surfaces of the IC package. The external antenna element is inductively coupled to the integrated antenna element, and the IC package laterally supports the at least one half turn of the external antenna element.

A disclosed method of making a radio frequency (RF) tag includes attaching an integrated circuit (IC) package to a substrate. The IC package has an integrated antenna element coupled to circuitry of the IC package. The method further includes wrapping round wire against at least two sides of the IC package forming at least one half turn of an external antenna element around the IC package. The IC package laterally supports the at least one half turn of the external antenna element.

The above summary is not intended to describe each disclosed embodiment. The figures and detailed description that follow provide additional example embodiments.

BRIEF DESCRIPTION OF THE DRAWINGS

Other aspects and advantages will become apparent upon review of the Detailed Description and upon reference to the drawings in which.

DETAILED DESCRIPTION

Figure 1:
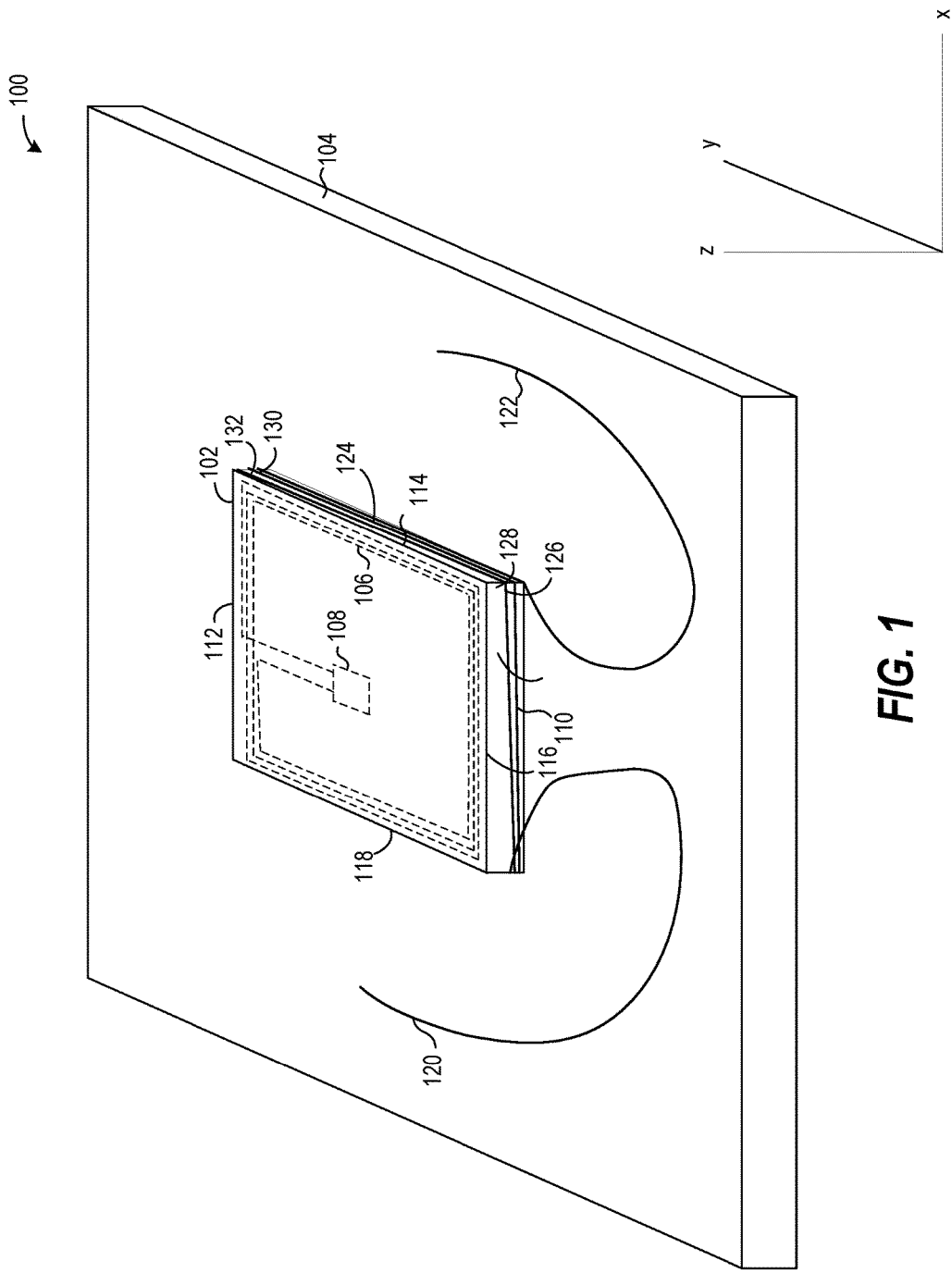
FIG. 1 shows an exemplary RF tag according to one implementation. The RF tag 100 includes an IC package attached to a substrate.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Some manufacturers use round wire rather than printed-and-etched patterns of conductive material for wiring the electronic devices. "Wire" as used herein does not refer to printed or printed-and-etched patterns of conductive material. Rather, as used herein, wire refers to a strand of conductive material having a round cross-section that has been made, for example, by drawing the conductive material through draw plates. Using a fine gauge copper wire to make antennas eliminates the use of environmentally hazardous chemicals as would be required for printed-and-etched antennas.

Antenna designers face a number of challenges in designing antennas for radio frequency (RF) transponders. The designer must design the antenna to exhibit a suitable radiation pattern and eliminate undesirable nulls. The antenna must have a suitable range for the application, operate at a desired frequency, and have a suitable level of sensitivity. The impedance of the antenna must be matched to connection pads of integrated circuitry. Even a small change to a physical characteristic of an antenna can make the antenna unsuitable for the desired application.

Further challenges faced by the antenna designer are those associated with manufacturability. For example, in order for the resulting product to be cost effective the designer must consider the speed at which the antenna and associated structure can be manufactured, the cost of materials, and the complexity of the manufacturing process. In addition, the desired durability and size of the resulting product will affect the manufacturability and performance of the antenna.

Passive RF tags sometimes employ an external antenna coupled to an integrated circuit (IC) package or die, because connecting the external antenna to the IC can be problematic due to the size of the bond pads relative to the size of the IC package or die. Intermediate, external antenna elements have been used in combination with IC dies or packages having an integrated antenna element. An intermediate, external antenna element is inductively coupled to the integrated antenna element for communicating a signal received from an external source such as a reader. The inductive coupling eliminates the need for bonding an external antenna to an IC package or die.

The position of an intermediate, external antenna element relative to the integrated antenna element is critical for achieving a desired read range. To optimize the read range, it is desirable to place the intermediate, external antenna element directly over the integrated antenna element on the IC die. However, the small size of the IC package can make alignment of the intermediate, external antenna element directly over the integrated antenna element problematic, and thereby reduce the read range. Even if direct alignment were not problematic, formation of the intermediate, external antenna element may be limited to print-and-etch technologies.

Further complications arise from the size of the IC package relative to patterns that can be made from the wire. In some approaches to laying fine-gauge round wire on a layer of adhesive, the minimum radius that can be formed may be too large relative to the size of the IC die or package. For example, in one approach, the minimum radius that can be achieved is 2 mm. For a square target device having a 2.8 mm edge, the 2.0 mm radius may be large to construct an intermediate, external antenna element in direct alignment with the integrated antenna element.

The disclosed approaches place an intermediate external antenna in close proximity to the integrated antenna to achieve a suitable read range without the need for a printed-and-etched antenna. The disclosed RF tags include an IC package attached to a substrate. The IC package include RF transponder circuitry and an integrated antenna element. The IC package provides lateral support for an external antenna element, which is round wire wrapped at least partially around the IC package in at least one half turn.

FIG. 1 shows an exemplary RF tag 100 according to one implementation. The RF tag 100 includes an IC package 102 attached to a substrate 104. The IC package includes an integrated antenna element 106 coupled to RF transponder circuitry 108 of the IC package. The RF tag further includes an external antenna element 110. The external antenna element includes a portion of round wire disposed in at least one half turn wrapped around and against the IC package. The proximity of the external antenna element to the integrated antenna element 106 provides inductive coupling between the antenna elements. Instead of disposing turns of the antenna wire on the surface of the substrate surrounding the IC package, the external antenna element is wrapped around two or more sides of the IC package. The IC package thereby provides lateral support (in the x and y axes) to portions of the external antenna element.

The IC package 102 includes an IC die that is encapsulated in a structure for protection against environmental damage. Packaging material can include plastic or ceramic. In other implementations, the IC package is a bare die. The RF transponder circuitry 108 of the IC package can be passive or active according to application requirements. A separate battery (not shown) can be connected to the IC package for an active RF transponder.

The IC package 102 includes an integrated antenna element 106. The integrated antenna element can include one-half or more turns and is disposed within the IC package. The exemplary antenna 106 includes multiple turns that are disposed near the edges 112, 114, 116, 118 (perimeter) of the IC package. The turns of the integrated antenna 106 are as near to the edges of the IC package and can be as close to one another as manufacturing processes permit. The substrate 104 can be any material suitable for the intended application. The substrate can be an integral part of a final product or can be an intermediate structure to be attached to a target article.

Figure 2:
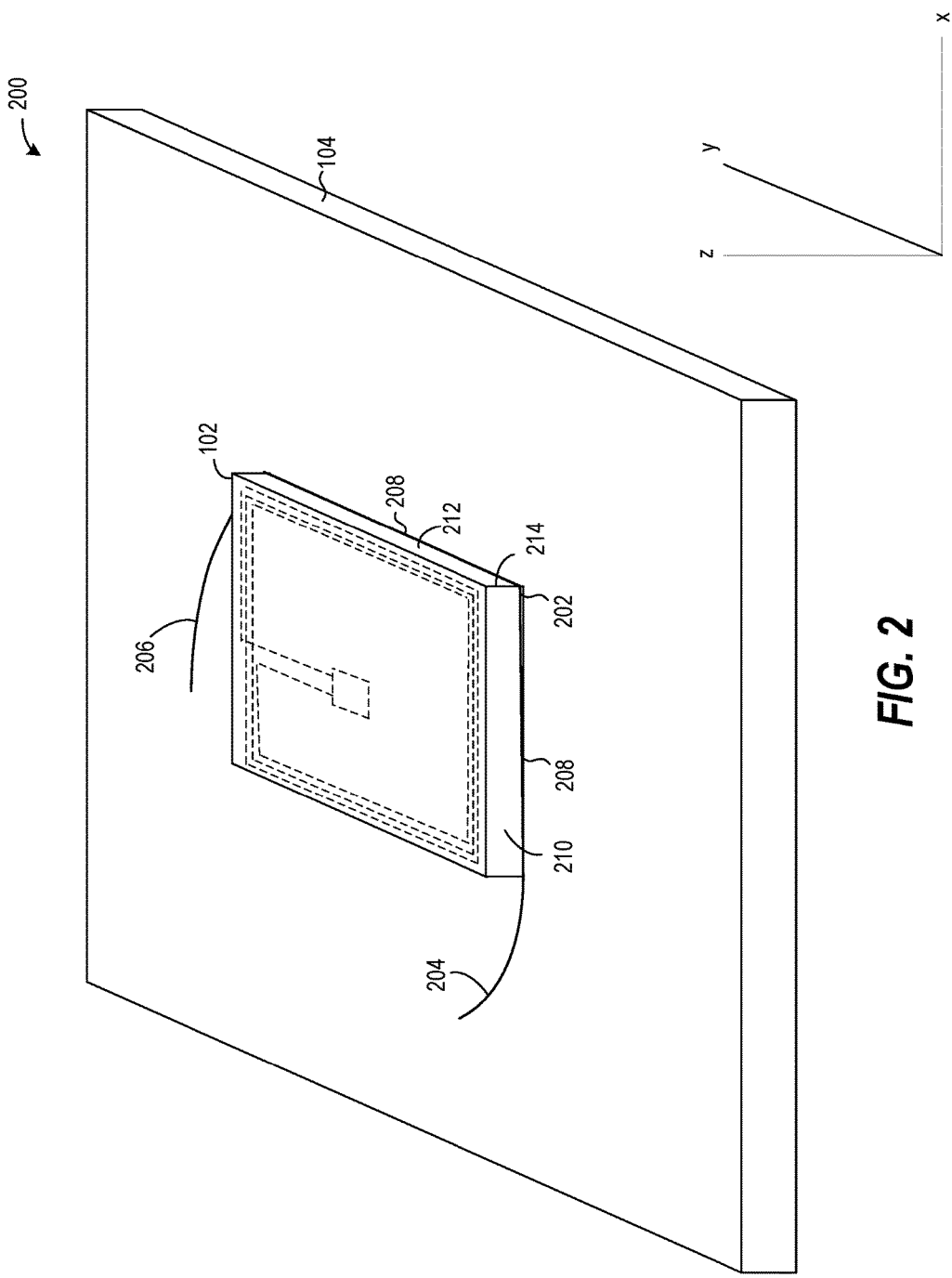
FIG. 2 shows an exemplary RF tag according to an implementation having an external antenna element disposed in one half turn and wrapped against IC package.

The external antenna element 110 is constructed from round wire that is wrapped at least partially around the IC package 102. The external antenna element can include multiple turns, as shown, or at least one half turn and less than a full turn as shown in FIG. 2. A single turn is also an alternative as is a combination of multiple full turns and a partial turn.

Portions of the wire that form the external antenna element are disposed against surfaces of the IC package. In the exemplary RF tag 100, portion 126 of the external antenna element is disposed against surface 128 of the IC package, and portion 130 is disposed against surface 132. The wire can directly contact side surfaces and/or corner edges of the IC package.

The external antenna element 110 has two end portions 120, 122 and a middle portion 124. The length of the end portions can be adjusted to control frequency sensitivity. The middle portion 124 includes the wire that is wrapped around sides of the IC package 102. In an exemplary implementation, the end portions 120 and 122 are attached to the surface of the substrate 104.

FIG. 2 shows an exemplary RF tag 200 according to an implementation having an external antenna element 202 disposed in one half turn and wrapped against IC package. The external antenna element is round wire as previously described and includes end portions 204 and 206 and middle portion 208. The end portions of the external antenna element extend from the sides of the IC package 102 and can be attached to the surface of the substrate 104. The middle portion 208 forms at least one half turn and is wrapped partially around and against the IC package. The sides 210 and 212 and corner 214 provide lateral support for the middle portion of the external antenna element.

Figure 3:
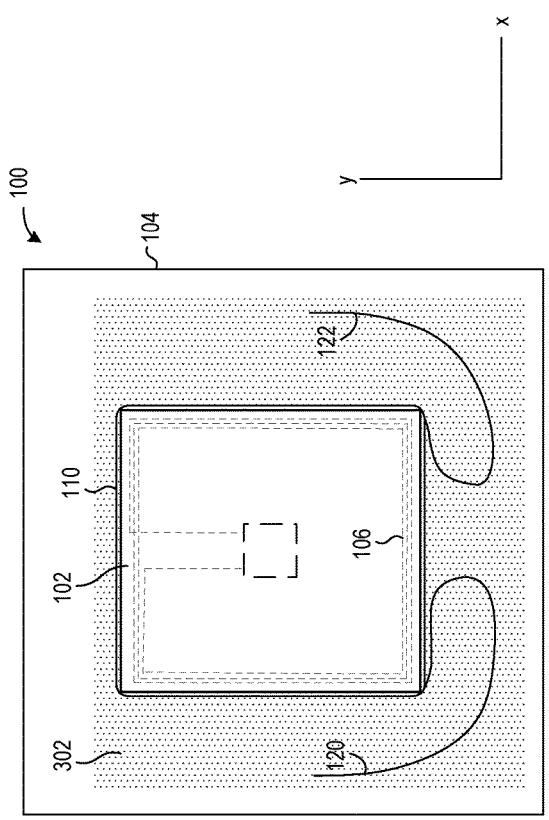
FIG. 3 shows a top view of the exemplary RF tag.

FIG. 3 shows a top view of the exemplary RF tag 100. The IC package 102 and end portions 120 and 122 of the external antenna element 110 can be attached to the substrate 104 by a layer of adhesive 302. The adhesive can be a pressure-sensitive adhesive, or a hot-melt adhesive such as ethylene-vinyl acetate (EVA). The portions of the external antenna element 110 and/or the IC package 102 can be directly in contact with the layer of adhesive 302.

Figure 4:
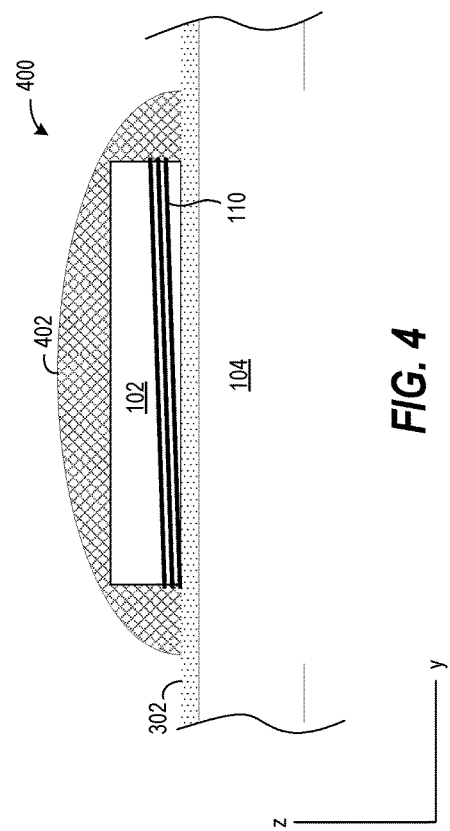
FIG. 4 shows a partial side view and partial cutaway view of an RF tag.

FIG. 4 shows a partial side view and partial cutaway view of an RF tag 400. The RF tag includes an IC package 102, substrate 104, external antenna element 110, and layer of adhesive 302 as described above. The RF tag further includes a polymer conformal coating 402 that covers the IC package and the external antenna element 110. The polymer conformal coating 402, which is sometimes referred to as a "glob-top," covers the IC package 102, external antenna element 110, including the end portions 120, 122, 204, and 206, which are shown in FIGS. 1, 2, and 3. The polymer conformal coating 402 may be an epoxy, acrylic, polyurethane, or silicone, depending on application requirements.

Figure 5:
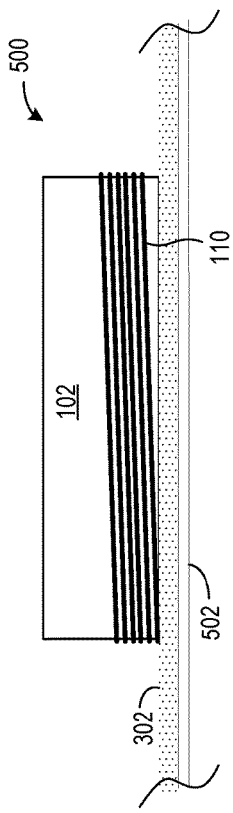
FIG. 5 shows a partial side view of an RF tag.

FIG. 5 shows a partial side view of an RF tag 500. The RF tag includes an IC package 102, external antenna element 110, and layer of adhesive 302 as described above. The substrate of the RF tag 500 is a release liner 502. The release liner is a temporary backing of the adhesive layer and can be removed for adhering the RF tag to a target article. The RF tag 500 can further include a conformal coating (not shown), such as the conformal coating shown in FIG. 4. The release liner can be paper, polyester, or biaxially oriented polypropylene film (BOPP), for example.

Figure 6:
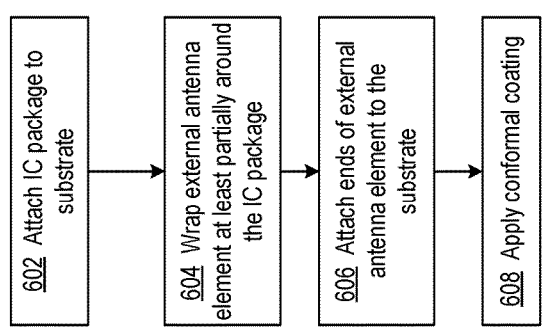
FIG. 6 shows a flowchart of an exemplary process of making an RF tag.

FIG. 6 shows a flowchart of an exemplary process of making an RF tag. At block 602, an IC package is attached to a substrate. The IC package has an integrated antenna element coupled to circuitry of the IC package. A pick-andplace machine can be used to place the IC package on the adhesive layer of a substrate at a desired location.

At block 604, a fine-gauge round wire is wrapped at least partially around the IC package, and at block 606, end portions of the wire are adhered to the layer of adhesive on the substrate to form an external antenna element. The actions of blocks 604 and 606 can be conformed in conjunction with one another. That is, one end portion of the wire can be attached to the layer of adhesive, and then the wire can be wrapped against two or more sides of the IC package. Once the wrapping of the wire around the IC package forms the desired number of turns (one-half turn or more), the other end of the wire can be attached to the layer of adhesive.

At block 608, a conformal coating can be applied to the IC package and external antenna element.

The present invention is thought to be applicable to a variety of applications. Other aspects and embodiments will be apparent to those skilled in the art from consideration of the specification and practice of the circuits and methods disclosed herein. It is intended that the specification and illustrated embodiments be considered as examples only, with a true scope of the invention being indicated by the following claims.

What is claimed is:

1. A radio frequency (RF) tag, comprising:
   a substrate;
   an integrated circuit (IC) package disposed on the substrate and having an integrated antenna element coupled to circuitry of the IC package; and
   an external antenna element of round wire having at least one half turn disposed against two or more surfaces of the IC package, wherein the external antenna element is inductively coupled to the integrated antenna element, and the IC package laterally supports the at least one half turn of the external antenna element.

2. The RF tag of claim 1, wherein:
   the external antenna element includes a first end portion, a middle portion, and a second end portion;
   the first end portion is disposed on a surface of the substrate;
   the middle portion includes the at least one half turn of the external antenna element; and
   the second end portion is disposed on the surface of the substrate.

3. The RF tag of claim 1, wherein the integrated antenna element includes a plurality of turns.

4. The RF tag of claim 1, wherein the plurality of turns are disposed proximate a perimeter of the IC package.

5. The RF tag of claim 1, wherein:
   the substrate includes:
      a release liner, and
      a layer of adhesive disposed on the release liner; and
   the IC package is disposed directly on the layer of adhesive.

6. The RF tag of claim 5, wherein:
   the external antenna element includes a first end portion, a middle portion, and a second end portion;
   the first end portion is directly disposed on a surface of the layer of adhesive;
   the middle portion includes the at least one half turn of the external antenna element; and
   the second end portion is directly disposed on the surface of the layer of adhesive.

7. The RF tag of claim 1, further comprising a polymer conformal coating that covers the IC package and the external antenna.

8. The RF tag of claim 1, wherein the IC package includes a passive RF transponder.

9. The RF tag of claim 1, wherein the IC package includes an active RF transponder.

10. A method of making a radio frequency (RF) tag, comprising:
   attaching an integrated circuit (IC) package to a substrate, wherein the IC package has an integrated antenna element coupled to circuitry of the IC package; and
   wrapping round wire against at least two sides of the IC package forming at least one half turn of an external antenna element around the IC package such that the IC package laterally supports the at least one half turn of the external antenna element.

* * * * *